US006586728B1

(12) United States Patent
Gavin et al.

(10) Patent No.: US 6,586,728 B1
(45) Date of Patent: Jul. 1, 2003

(54) VARIABLE WIDTH DIGITAL FILTER FOR TIME-OF-FLIGHT MASS SPECTROMETRY

(75) Inventors: Edward J. Gavin, San Jose, CA (US); Leonid Braginsky, Newton, MA (US)

(73) Assignee: Ciphergen Biosystems, Inc., Fremont, CA (US)

( * ) Notice: Subject to any disclaimer, the term of this patent is extended or adjusted under 35 U.S.C. 154(b) by 0 days.

(21) Appl. No.: 09/569,158

(22) Filed: May 11, 2000

Related U.S. Application Data

(60) Provisional application No. 60/134,072, filed on May 13, 1999.

(51) Int. Cl.[7] .......................... H01J 49/26; B01D 59/44
(52) U.S. Cl. ....................................... 250/287; 250/281
(58) Field of Search ................................ 250/282, 287, 250/290, 288

(56) References Cited

U.S. PATENT DOCUMENTS 4,733,073 A * 3/1988 Becker et al. .............. 250/288
4,945,234 A * 7/1990 Goodman et al. .......... 250/291
5,168,158 A * 12/1992 McComas et al. .......... 250/282
5,187,365 A * 2/1993 Kelley ........................ 250/282
5,594,243 A * 1/1997 Weinberger et al. ........ 250/288
5,703,358 A * 12/1997 Hoekman et al. ........... 250/282
5,770,857 A * 6/1998 Fuerstenau et al. ......... 250/281
5,905,258 A * 5/1999 Clemmer et al. ........... 250/282

OTHER PUBLICATIONS

William H. Press et al, "Numerical Recipes in C" *The Art of Scientific Computing Second Edition*, 1992 (pp. 651–654).

* cited by examiner

*Primary Examiner*—John R. Lee
*Assistant Examiner*—Anthony Quash
(74) *Attorney, Agent, or Firm*—Townsend and Townsend and Crew LLP

(57) ABSTRACT

A method and system of detecting mass to charge ratio of ions. The method includes producing charged ions in a vacuum, accelerating the charged ions in an electric field into a free flight tube and detecting the charged ions at a detector associated with the free flight tube. A control system selects a bandwidth for filtering a signal produced by the detector and the signal produced by the detector is then filtered with a variable width digital filter based upon the selected bandwidth. The bandwidth for filtering the signal may be selected from a look-up table within the control system based upon the mass to charge ratio of an ion of interest. Alternatively, a peak bandwidth within the signal produced by the detector may be determined and the signal produced by the detector may then be filtered with the variable width digital filter based upon the determined peak bandwidth.

12 Claims, 5 Drawing Sheets

VARIABLE WIDTH DIGITAL FILTER FOR TIME-OF-FLIGHT MASS SPECTROMETRY

This application claims priority from U.S. Provisional Patent Application Serial No. 60/134,072, filed May 13, 1999, the disclosure of which is incorporated herein by reference in its entirety.

BACKGROUND OF THE INVENTION

1. Field of the Invention

The present invention relates to a software filter for use with time-of-flight mass spectrometry, and more particularly, to a variable width digital filter for use with time-of-flight mass spectrometry.

2. Description of the Prior Art

With reference to FIG. 1, time-of-flight mass analyzers or spectrometers consist of a source/extraction region 10, a drift region 11 and a detector 12. In the source region, an electrical field (E=V/s) accelerates the ions to a constant energy. The drift region is field free and ions cross the drift region with velocities that are inversely proportional to the square root of their respective masses. Thus, lighter ions have higher velocities and arrive at the detector sooner than heavier ions.

In the ideal situation where ions are formed at a single point in the source region, ions are accelerated to the same final kinetic energy:

$$\frac{1}{2}mv^2 = eV$$

and cross the drift regions with velocities:

$$v = \left[\frac{2eV}{m}\right]^{1/2}$$

and flight times:

$$t = \left[\frac{m}{2eV}\right]^{1/2}$$

These relationships depend upon the square root of the ions' masses.

In a mass spectrometer, the mass resolution is defined as m/Δm. In a time-of-flight mass spectrometer in which ions are accelerated to constant energy:

$$\frac{m}{\Delta m} = \frac{t}{2\Delta t}$$

In time-of-flight mass spectrometers, it is not unusual to see a wide mass range being scanned at any given time. Ions with molecular weights between 100 and several thousand Da, ions ranging from 3,000 to about 20,000 Da, as well as all ions greater than 20,000 Da, are typically simultaneously studied in such techniques as Surface Enhanced Laser Desorption Ionization SELDI and Matrix Assisted Laser Desorption Ionization (MALDI).

The fundamental physical processes involved in the previously mentioned processes are such that signals created by heavy ion populations are generally composed of lower frequency components than their light ion counter parts. For signals created by light ion populations, broad detection bandwidths are required to accurately sample these fast transients allowing for enhanced resolution mass measurement. Signals from heavier ion populations typically do not possess significant high frequency components and thus may be sampled at significantly lower bandwidth frequencies. Table 1 lists theoretical major frequency components and estimates peak widths and mass resolutions of various ion signal populations along with their estimated times of flight and molecular weights as generated by a SELDI or MALDI time-of-flight mass spectrometer with one-meter drift region and 25 keV total energy.

TABLE 1

| Ion Molecular Weight (m/z) | Ion Flight Time (uSec) | Major Component Frequency (MHZ) | Peak Width At Half Height (uSec) | Mass Resolution |
|---|---|---|---|---|
| 500 | 10.2 | 740 | 0.0010 | 5000 |
| 1,000 | 14.4 | 500 | 0.0016 | 4500 |
| 2,000 | 20.4 | 250 | 0.0034 | 3000 |
| 5,000 | 32.2 | 70 | 0.0134 | 1200 |
| 15,000 | 55.8 | 19 | 0.0254 | 1100 |
| 40,000 | 91.1 | 2 | 0.3037 | 150 |
| 150,000 | 176.3 | .290 | 1.7600 | 50 |
| 250,000 | 227.6 | .130 | 3.8000 | 30 |
| 500,000 | 321.9 | .063 | 8.0500 | 20 |

Thus, by reviewing Table 1, it can be seen that the peak width at half height and mass resolution of a given ion population can be correlated to ion flight time for a given ion total kinetic energy and a given free flight distance. Most time-of-flight mass spectrometers incorporate a fixed drift region distance. Furthermore, these devices also operate using either a fixed level or precisely selectable levels of ion acceleration, thus allowing qualified approximations of ion total kinetic energy. Under such conditions, it would be possible to predict the signal frequency requirements for a variety of ion populations based upon their time of detection.

The wider a peak width is, the more ions of different "sizes" may be contained within the particular ion population that is being detected. Hence, it is desirable to accurately display peak widths.

Just as in other forms of spectroscopy, time-of-flight mass spectrometry has several sources of signal noise. Such signal noise may increase peak widths. Typical noise sources such as sampling noise (alaising), Johnson noise, and flicker noise contribute to the total system noise. However, sensible engineering approaches will often reduce these noise sources to insignificant levels. Often, the most frequently encountered noise in time-of-flight mass spectrometry measurements is high frequency noise created by the detection apparatus. The combined use of secondary ions/electron generation schemes with high gain electroemissive detection surfaces frequently introduce high frequency noise that is the direct result of spurious background gas ionization, thermal or low energy photon noise (dark current noise), as well as higher energy photon or other particle-induced noise. Thus, when considering the above factors regarding ion signal component frequencies and time-of-flight mass spectrometry noise characteristics, it is evident that a fixed width filter is not a desirable solution for addressing noise problems. A filter in which the bandwidth may be varied over time range of the time-of-flight spectrum may better optimize the tradeoffs between increasing the signal to noise ratio while having the least negative effect on the mass resolution.

SUMMARY OF THE INVENTION

A method of detecting mass to charge ratio of ions in accordance with the present invention includes producing charged ions in a vacuum, accelerating the charged ions with an electric field into a free flight tube, and detecting the charged ions at a detector associated with the free flight tube. With a control system, a bandwidth for filtering a signal produced by the detector is selected. The signal produced by the detector is then filtered with a variable width digital filter based upon the selected bandwidth.

In accordance with one aspect of the present invention, the bandwidth for filtering the signal is selected from a look-up table within the control system based upon the mass to charge ratio of an ion of interest.

In accordance with a further aspect of the present invention, the method of detecting mass to charge ratio of ions further includes determining a peak bandwidth within the signal and filtering the signal produced by the detector with the variable width digital filter based upon the determined peak bandwidth.

Accordingly, the present invention provides a system and method, especially well suited for time-of-flight mass spectrometry wherein the width of a digital filter of varied over the mass spectrum to optimize the signal to noise improvement throughout the mass range. This is done without significantly compromising the mass resolution.

Other features and advantages of the present invention will be understood upon reading and understanding the detailed description of the preferred exemplary embodiments found hereinbelow, in conjunction with reference to the drawings, in which like numerals represent like elements.

DETAILED DESCRIPTION OF THE PREFERRED EXEMPLARY EMBODIMENTS

Figure 1:
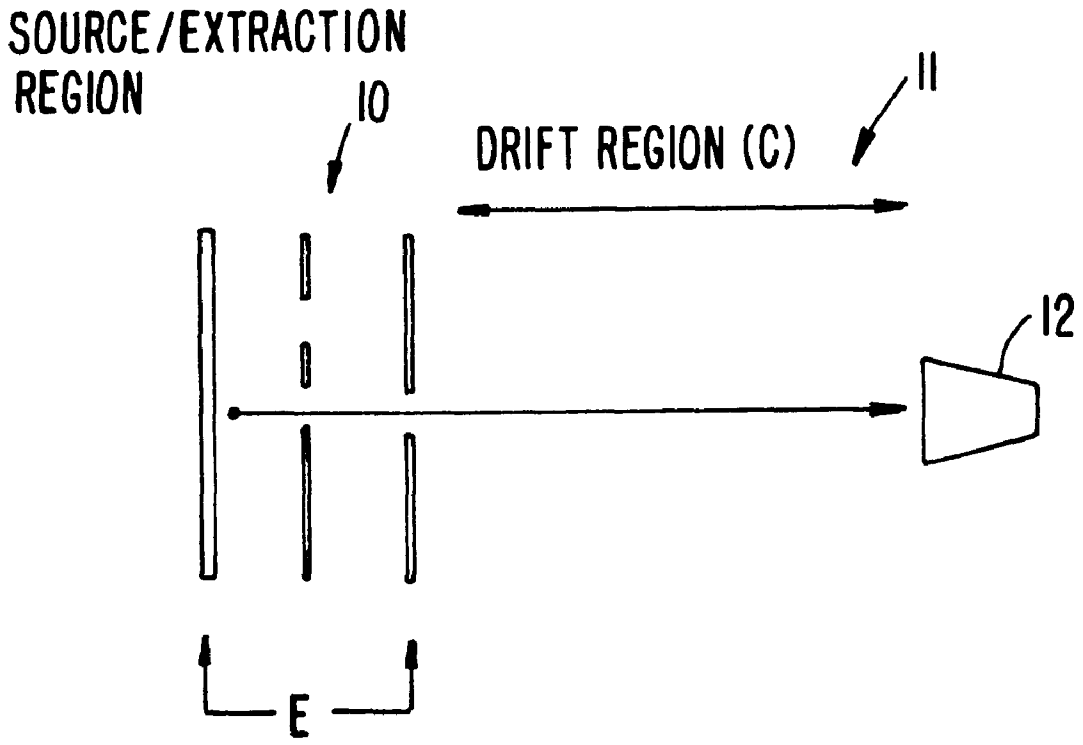
FIG. 1 is a schematic illustration of a time-of-flight mass spectrometer.
Figure 2:
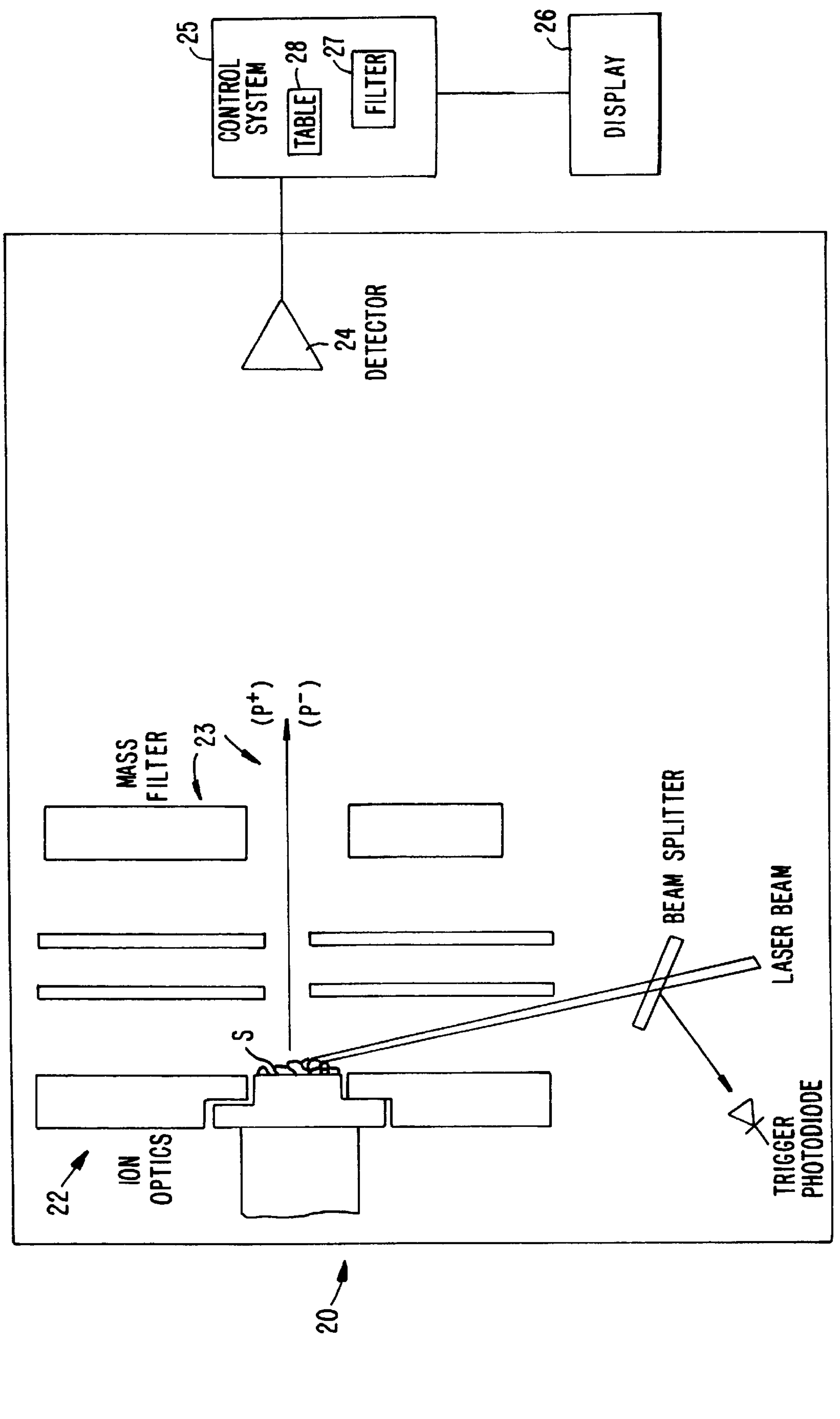
FIG. 2 is a schematic diagram of one possible embodiment of a mass spectrometer system in accordance with the present invention.

Generally, a mass spectrometer 20 charges or ionizes molecules of a sample S into ions P in a vacuum 21. These ions are accelerated by an electric field produced by an ion-optic assembly 22 into a free flight tube 23. The velocity at which the ions may be accelerated is proportional to the square root of the accelerating potential, the square root of the charge of the molecule and inversely proportional to the square root of the mass of the molecule. The charged ions travel, i.e., “drift” down the time-of-flight tube to a detector 24.

Detector 24 generates a signal, generally an electronic signal, that is generally received, and preferably stored, in a control system 25, such as for example, a computer or the like. The signal is then displayed on some type of a display screen 26, such as a computer monitor, an oscilloscope, etc. Such viewing may be done either in real time, i.e., as the signal is received from the detector, or from the stored signal.

As previously discussed, time-of-flight mass spectrometry has several sources of signal noise that include, for example, sampling noise (alaising), Johnson noise, and flicker noise. Some of the most frequently encountered noise in time-of-flight spectrometry measurements is high frequency noise created by the detector. Often the detector includes secondary ion/electron generation schemes with high gain electroemissive detection surfaces that frequently introduce high frequency noise that is the direct result of spurious background gas ionization, thermal or low energy photon noise (dark current noise), as well as higher energy photon or other particle-induced noise.

A digital filter is a linear/shift-variance system for computing a discreet output sequence form a discreet input sequence. The digital filter is applied to a series of equally spaced data values $f_i \equiv f(t_i)$, where $t_i \equiv t_0 + \Delta$ for some constant sample spacing $\Delta$ and $i = \ldots -2,-1,0,1,2 \ldots$ The simplest type of digital filter, commonly referred to as a fixed width moving average filter, replaces each value $f_i$ by a linear combination $g_i$ of itself and some number of nearby neighbors, $$g_i = \sum_{n=n_L}^{n_R} c_n f_{i+n}$$

Here $n_L$ and $n_R$ are the numbers of data points used to the left and to the right of data point i respectively. $n_L$ and $n_R$ are both constants, thus, the filter has a constant width of $n_L + n_R + 1$.

Replacing constants $n_L$ and $n_R$ with $n_{Li} = n_L(t_i)$ and $n_{Ri} = n_R(t_i)$ creates a variable width digital filter.

$$g_i = \sum_{n=-n_{L_i}}^{n_{R_i}} c_n f_{i+n}$$

Such a variable width digital filter 27 is included with control system 25 and is applied to signal data received from the detector to increase the signal to noise ratio of the spectrum. The variable width digital filter utilizes the fact that data is over-sampled in the time domain. Increasing the filter width decreases the signal bandwidth, and can improve the signal to noise ratio if the signal of interest is a far lower frequency than the noise. Thus, the variable width digital filter offers the ability to filter the data after the data has been recorded without permanently changing the raw spectrum data. Therefore, the data may be examined and the filter adjusted to optimize the trade-offs between signal to noise enhancement and resolution that filtering the data imposes.

In a preferred embodiment, a look-up table 28 is provided within the control system for selecting the bandwidth of the variable width digital filter. The bandwidth is selected based upon observed or theoretical data related to varying mass to charge ratios of ions. Alternatively, the control system may be programmed such that upon receiving signals from detector 24 or upon analyzing saved or recorded signals already received from the detector, the widths of the various peaks within the signal are determined in the bandwidth for the variable width digital filter as used therein.

FIGS. 3–6 illustrate the improvement in signal to noise and resolution that a variable width filter in accordance with the present invention provides. The same spectrum is compared unfiltered, with a 51 point fixed moving average filter, and with a variable width moving average filter. The data was acquired at 250 MHz, making the 51 point moving average filter 0.024 microseconds wide. The variable width filter varies its width in points by interpellating a table of Mz to expected peak widths. Table 2 illustrates an example of width values that were used to calculate the variable filter widths for the figures. In the figures, the X-axis represents the mass/charge ratio (M/Z) while the Y-axis represents arbitrary ion intensity units.

TABLE 2

Variable Width Filter Table

| Position (Daltons) | Width (Daltons) |
|---|---|
| 0 | 10 |
| 33000 | 650 |
| 147000 | 5500 |

Figure 3:
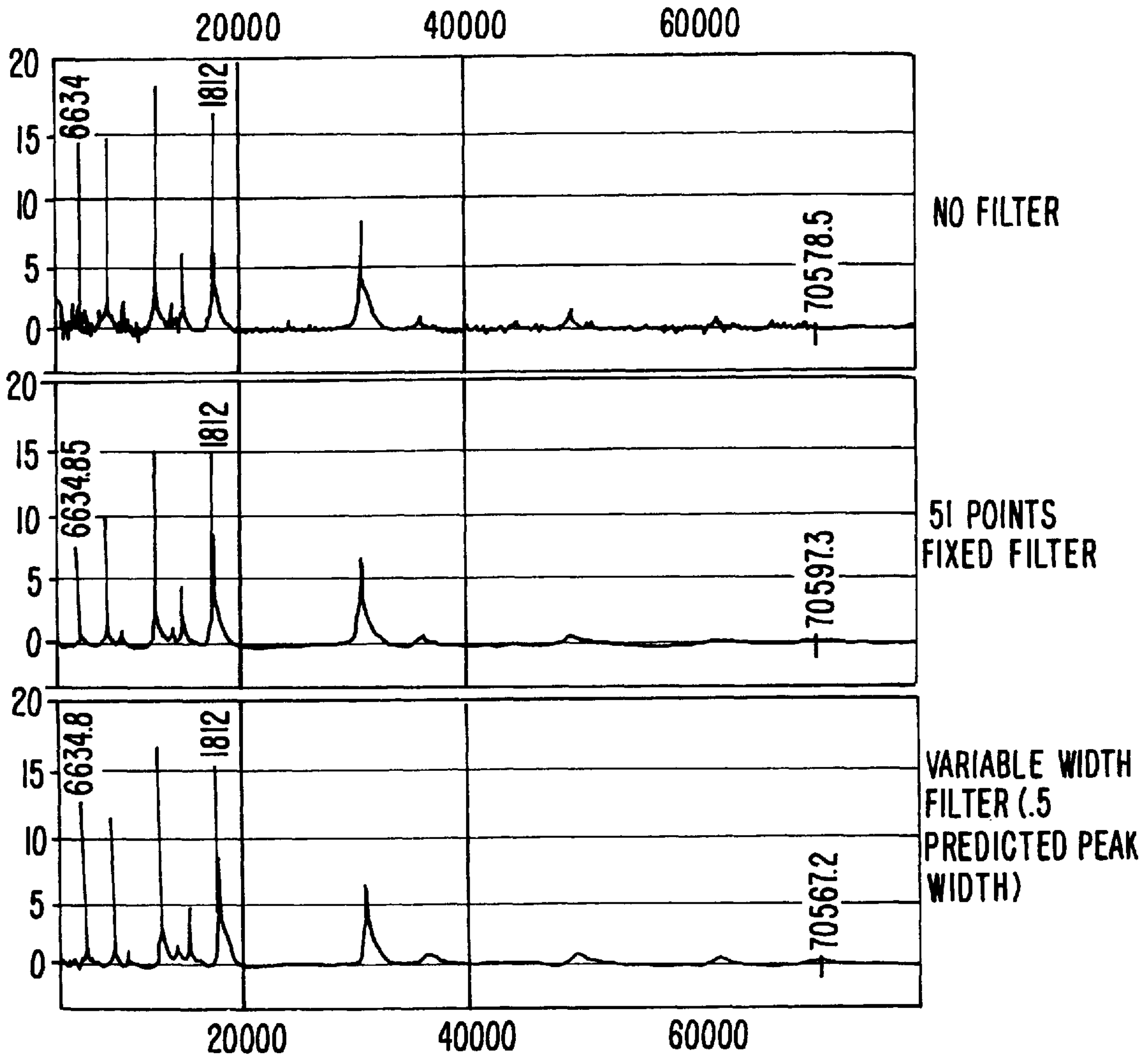
FIGS. 3–6 are graphs illustrating the effect of a variable width digital filter in accordance with the present invention on signals from a mass spectrometer.
Figure 4:
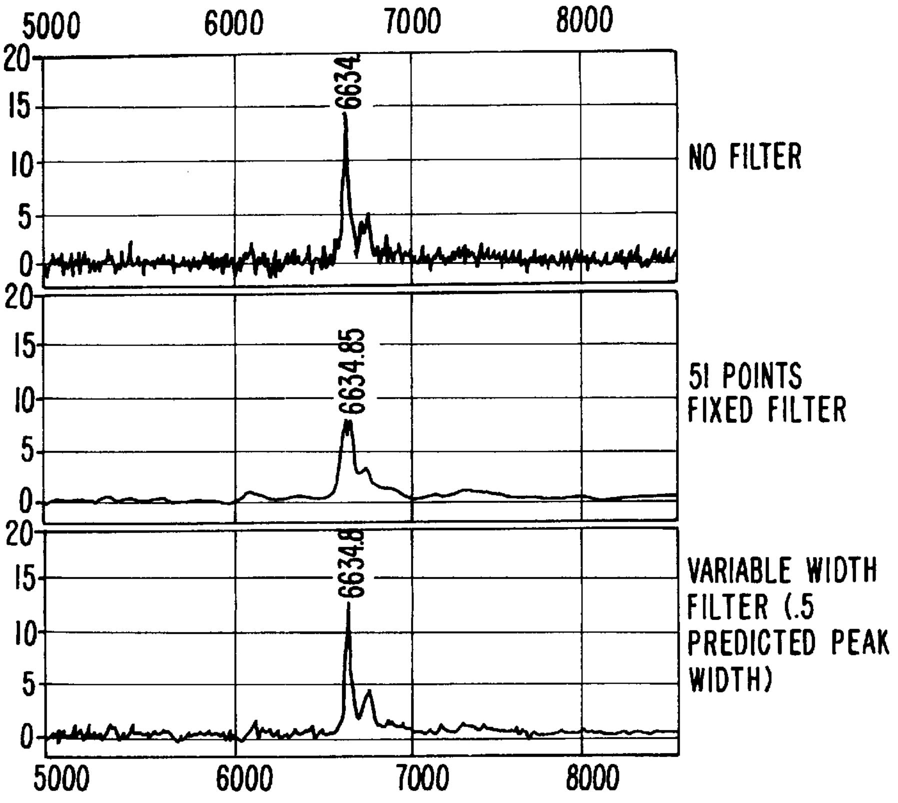
Figure 5:
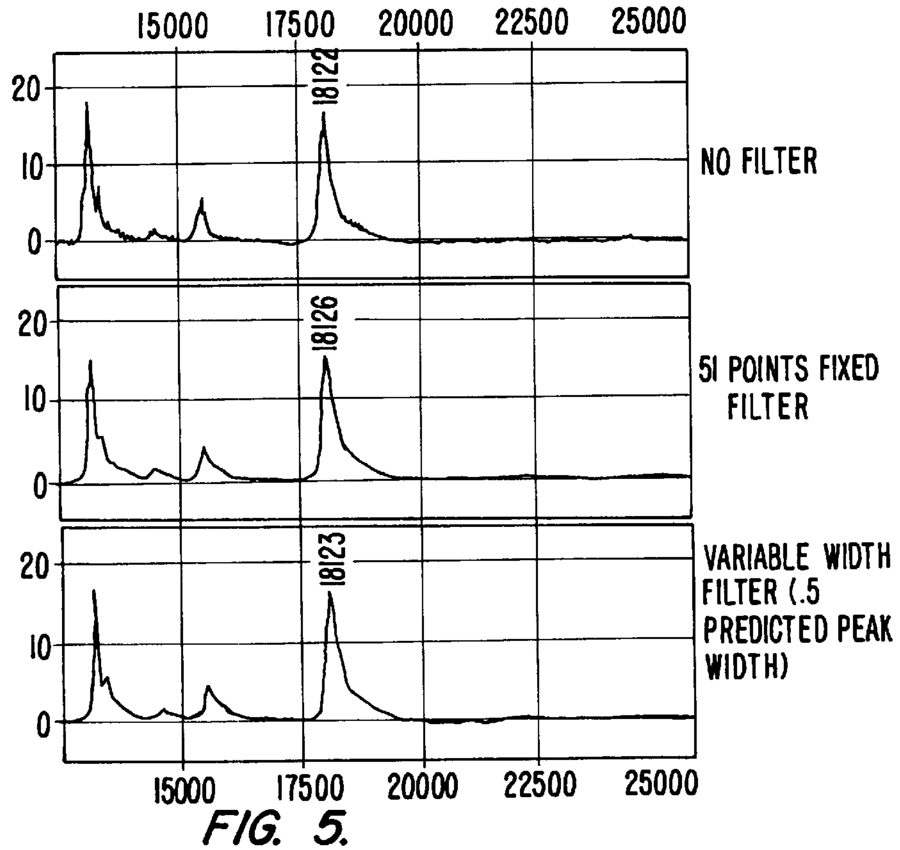
Figure 6:
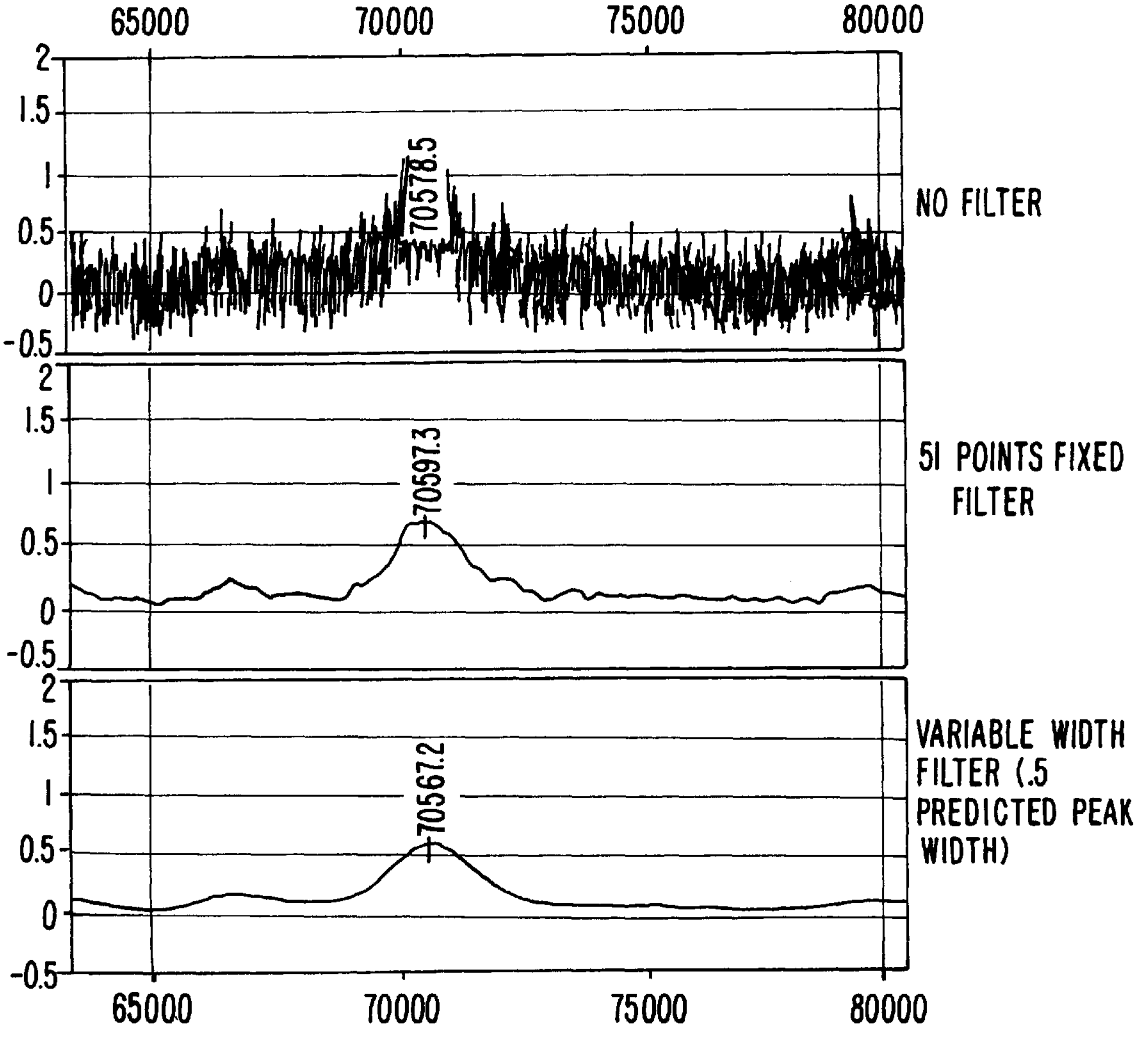

FIG. 3 illustrates the entire spectra of example data. FIGS. 4–6 illustrate the detailed view of peak 1, which occurred at 6,634 daltons, a detailed view of peak 2, which occurred at 18,123 daltons, and a detailed view of the third peak, which occurred at 70,567 daltons, respectively. Tables 3 and 4 illustrate the effect of filtering on M/Z resolution and the effect of filtering on the signal to noise ratio.

TABLE 3

Effect Of Filtering On M/Z Resolution

| | | M/Z Resolution | | |
|---|---|---|---|---|
| Peak # | M/Z | No Filter | 51 Point Fixed | Variable Width |
| 1 | 6634 | 147 | 71 | 135 |
| 2 | 18123 | 82 | 42 | 63 |
| 3 | 70578 | 40 | 33 | 42 |

TABLE 4

Effect Of Filtering On Signal To Noise Ratio

| | | Signal to Noise | | |
|---|---|---|---|---|
| Peak # | M/Z | No Filter | 51 Point Fixed | Variable Width |
| 1 | 6634 | 10 | 157 | 38 |
| 2 | 18123 | 21 | 616 | 424 |
| 3 | 70578 | .79 | 24 | 106 |

Thus, it can be seen that with a fixed width filter, the optimized filter value for mass resolution and signal to noise enhancement can only occur at a relatively small portion of the spectrum. With a variable width filter in accordance with the present invention, the entire spectrum may be optimized. Accordingly, it is easier to isolate peaks and therefore isolate ions as opposed to groups of ions.

Appendix A contains source code that provides an example of a variable width digital filter for time-of-flight mass spectrometry in accordance with the present invention written in C++.

Thus, the present invention provides a digital filter for time-of-flight mass spectrometry that varies the width of the filter over the mass spectrum to optimize the signal to noise improvement throughout the mass range without significantly compromising the mass resolution. This is accomplished by predicting the required filter width at a given time in the spectrum The predicted widths may be generated from theoretical or observed spectra.

Although the invention has been described with reference to specific exemplary embodiments, it will be appreciated that it is intended to cover all modifications and equivalents within the scope of the appended claims.

What is claimed is:

1. A method of detecting mass to charge ratio of ions, the method comprising:

generating a signal representing a time-of-flight mass spectrum; and filtering the signal with a software variable width digital filter, wherein the width of the filter varies over the mass spectrum, and wherein the width at a time-of-flight or M/Z is a function of expected peak width at the time-of-flight or M/Z.

2. The method of claim 1 wherein the width for filtering the signal is selected from a look-up table of M/Z to expected peak widths within a control system.

3. The method of claim 1 further comprising:

determining a peak width at a time-of-flight or M/Z within the signal; and filtering the signal with the variable width digital filter based upon the determined peak width.

4. The method of claim 1 wherein signal is generated by:

producing charged ions in a vacuum;

accelerating the charged ions with an electric field into a free-flight tube; and detecting the charged ions at a detector associated with the free-flight tube.

5. The method of claim 1, wherein the widths are determined from a generated signal or signals.

6. The method of claim 1 wherein the variable width digital filter is a moving average filter.

7. A system for detecting mass to charge ratio of ions, the system comprising:

a. a time-of-flight mass spectrometer that generates a signal representing a time-of-flight or M/Z;

b. a control system for receiving the signal from the mass spectrometer; and c. means for displaying the signal from the mass spectrometer;

wherein the control system includes a variable width digital filter for filtering the signal produced by the detector wherein the width of the filter varies over the mass spectrum and wherein the width at a time-of-flight or M/Z is a function of expected peak width at the time-of-flight or M/Z.

8. The system of claim 4 wherein the control system includes a look-up table for selecting a desired width of the filter based upon a mass to charge ratio of an ion of interest.

9. The system of claim 4 wherein the means for displaying comprises an oscilloscope.

10. The system of claim 8 wherein the mass spectrometer comprises:

i. a vacuum;

ii. an ion-optic assembly adjacent the vacuum;

iii. a free-flight tube adjacent the ion-optic assembly; and iv. a detector adjacent the free-flight tube.

11. The system of claim 7 wherein the widths are determined from a generated signal or signals.

12. The system of claim 7 wherein the variable width digital filter is a moving average filter.

* * * * *